(12) United States Patent
Halberstadt

(10) Patent No.: US 9,960,685 B2
(45) Date of Patent: May 1, 2018

(54) SYSTEM AND METHOD FOR SUPPLYING A SYNCHRONOUS RECTIFIER DRIVER CIRCUIT

(71) Applicant: NXP B.V., Eindhoven (NL)

(72) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 389 days.

(21) Appl. No.: 14/158,799

(22) Filed: Jan. 18, 2014

(65) Prior Publication Data

US 2015/0207414 A1    Jul. 23, 2015

(51) Int. Cl.
*H02M 3/335* (2006.01)

(52) U.S. Cl.
CPC ... *H02M 3/33507* (2013.01); *H02M 3/33592* (2013.01); *Y02B 70/1475* (2013.01)

(58) Field of Classification Search
CPC ......... H02M 3/33523; H02M 3/33561; H02M 3/33576; H02M 3/33592; Y02B 70/1475
See application file for complete search history.

(56) References Cited

U.S. PATENT DOCUMENTS

| | | | | |
|---|---|---|---|---|
| 5,828,558 A | * | 10/1998 | Korcharz | H02M 3/33515 363/20 |
| 6,856,522 B1 | * | 2/2005 | Wittenbreder, Jr. | H02M 1/083 363/21.01 |
| 6,961,253 B1 | * | 11/2005 | Cohen | H02M 1/08 363/89 |
| 7,944,716 B2 | | 5/2011 | Halberstadt | |
| 8,339,817 B2 | | 12/2012 | Halberstadt | |
| 2010/0182806 A1 | * | 7/2010 | Garrity | H02M 3/33569 363/21.14 |
| 2011/0286245 A1 | | 11/2011 | Zhan et al. | |

FOREIGN PATENT DOCUMENTS

| | | |
|---|---|---|
| CN | 102263509 A | 11/2011 |
| EP | 1 869 758 B1 | 10/2012 |
| EP | 2 546 968 A1 | 1/2013 |
| EP | 2 547 176 A1 | 1/2013 |
| WO | 2009/004582 A1 | 1/2009 |

OTHER PUBLICATIONS

Oruganti, Ramesh, et al; "Resonant Power Processors, Part II—Methods of Control"; IEEE Transactions on Industry Applications, vol. IA-21, No. 6; pp. 1461-1471 (Nov./Dec. 1985).
Office Action from counterpart application CN 201510023513.9; 10 pages (dated Dec. 15, 2016).

* cited by examiner

*Primary Examiner* — Nguyen Tran
*Assistant Examiner* — Monica Mata

(57) ABSTRACT

Methods for supplying a synchronous rectifier (SR) driver circuit and supply voltage generation circuits for a SR driver circuit are described. In one embodiment, a method for supplying a SR driver circuit involves receiving a converted voltage from a secondary winding of a transformer and generating a supply voltage for the SR driver circuit based on the converted voltage, where the supply voltage is higher than an output voltage of the transformer that is generated using the secondary winding. Other embodiments are also described.

17 Claims, 8 Drawing Sheets derstanding
SYSTEM AND METHOD FOR SUPPLYING A SYNCHRONOUS RECTIFIER DRIVER CIRCUIT Embodiments of the invention relate generally to electrical systems and methods and, more particularly, to systems and methods for supplying a synchronous rectifier (SR) driver circuit.

Synchronous rectifiers can be used to improve efficiency of power converters in power electronics. For example, synchronous rectifiers are generally used to replace a rectifier diode in order to reduce conduction losses. A typical synchronous rectifier can be formed by connecting a transistor, such as, a power metal-oxide-semiconductor field-effect transistor (MOSFET). The efficiency and effectiveness of synchronous rectifiers depends on the driving voltages of the synchronous rectifiers. In conventional synchronous rectifiers, supply voltages that are provided to driver circuits of SR switches are higher than the minimum required drive voltages of the SR switches. For example, an additional transformer winding or an output voltage adapter can be used to boost supply voltages that are provided to driver circuits of SR switches. However, additional transformer windings or output voltage adapters can add to the component costs of synchronous rectifiers. In addition, additional transformer windings require additional outputs on transformers, which are not desirable in some applications.

Methods for supplying a synchronous rectifier (SR) driver circuit and supply voltage generation circuits for a SR driver circuit are described. In one embodiment, a method for supplying a SR driver circuit involves receiving a converted voltage from a secondary winding of a transformer and generating a supply voltage for the SR driver circuit based on the converted voltage, where the supply voltage is higher than an output voltage of the transformer that is generated using the secondary winding. Other embodiments are also described.

In one embodiment, a supply voltage generation circuit for a SR driver circuit includes a first switch connected to a secondary winding of a transformer and the SR driver circuit, a second switch connected to the SR driver circuit and the secondary winding of the transformer or a fixed voltage, and a voltage supply circuit connected to the first and second switches and the SR driver circuit and configured to generate a supply voltage for the SR driver circuit based on a converted voltage from the secondary winding of the transformer. The supply voltage is higher than an output voltage of the transformer that is generated using the secondary winding.

In one embodiment, a method for supplying a SR driver circuit involves receiving a converted voltage from a secondary winding of a transformer and generating a supply voltage for the SR driver circuit based on the converted voltage. The supply voltage is higher than an output voltage of the transformer that is generated using the secondary winding. Generating the supply voltage includes closing a switch, which is connected between the secondary winding of the transformer and the SR driver circuit, during an interval in which an optimum energy transfer from the secondary winding to the SR driver circuit takes place.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
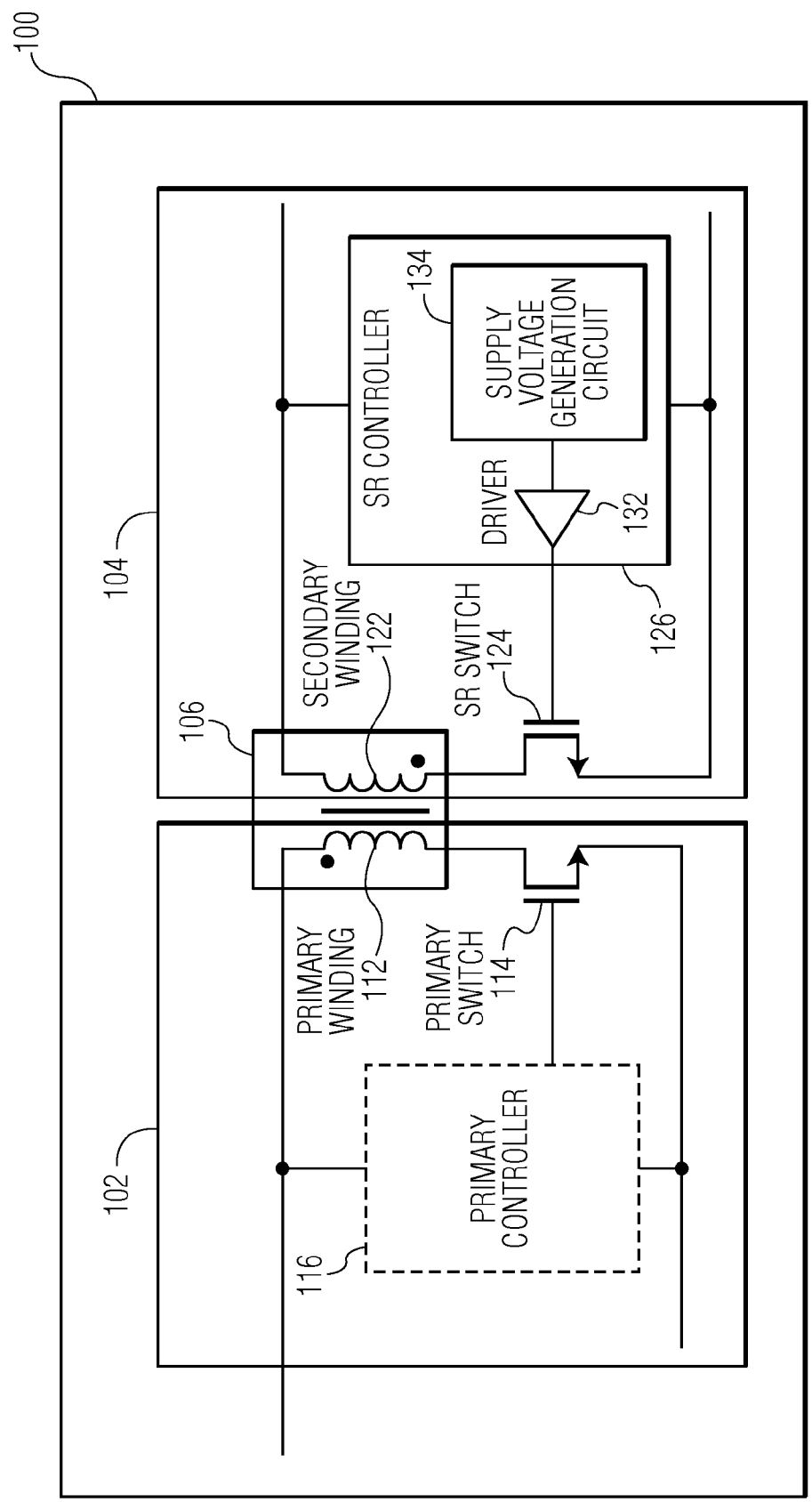
FIG. 1 is a schematic block diagram of a power converter circuit in accordance with an embodiment of the invention.

FIG. 1 is a schematic block diagram of a power converter circuit 100 in accordance with an embodiment of the invention. The power converter circuit can be used in various electrical applications. In the embodiment depicted in FIG. 1, the power converter circuit includes a primary power circuit 102 and a secondary power circuit 104.

The primary power circuit 102 of the power converter circuit 100 includes a primary winding 112, a primary switch 114 that is implemented as a metal-oxide-semiconductor field-effect transistor (MOSFET) transistor and a primary controller 116, which may be optional in some applications. Although the primary switch is implemented as a MOSFET transistor in the embodiment depicted in FIG. 1, in other embodiments, the primary switch may be implemented using other suitable switching device or circuit.

The secondary power circuit 104 of the power converter circuit 100 includes a secondary winding 122, a synchronous rectifier (SR) switch 124 that is implemented as a MOSFET transistor and an SR controller 126. The primary winding 112 and the secondary winding 122 forms a transformer 106. The transformer 106 has a voltage ratio or a winding turns ratio, "N," which may be a positive integer or any suitable number. Although the SR switch is implemented as a MOSFET transistor in the embodiment depicted in FIG. 1, in other embodiments, the SR switch may be implemented using other suitable switching device or circuit.

The SR controller 126 is configured to control the SR switch 124. In the embodiment depicted in FIG. 1, the SR controller includes a SR driver circuit 132 that is configured to drive the SR switch with a drive voltage and a supply voltage generation circuit/voltage regulator circuit 134 that is configured to provide a supply voltage to the driver circuit. The driver circuit may drive the gate terminal or other terminal of the SR switch. In some embodiments, the driver circuit senses the current that flows through the SR switch to generate the timing for the drive voltage. The supply voltage generation circuit may be implemented using one or more switches, resistors, diodes, capacitors and/or voltage regulators. In some embodiments, the supply voltage generation circuit includes a charge pump. The charge pump can be implemented by a diode and a capacitor that are connected to the secondary winding 122 of the transformer 106.

In some embodiments, the supply voltage generation circuit 134 receives a converted voltage from the secondary winding 122 of the transformer 106 and generates a supply voltage for the SR driver circuit 132 that is higher than an output voltage of the transformer based on the converted voltage from the secondary winding 122. The output voltage of the transformer 106 is generated using the secondary winding 122. The output voltage of the transformer 106 may be equal to the converted voltage from the secondary winding 122 or generated based on the converted voltage from the secondary winding 122. In other words, both the supply voltage for the SR driver circuit 132 and the output voltage of the transformer 106 are generated using the secondary winding 122. A switch, which is connected between the secondary winding of the transformer and the SR driver circuit, may be closed during an interval in which an energy transfer from the secondary winding to the SR driver circuit takes place. In one embodiment, the supply voltage generation circuit monitors a current that flows through the switch, which is connected between the secondary winding of the transformer and the SR driver circuit, while a primary switch that is connected to the primary winding 112 of the transformer 106 is closed and opens the switch when the current exceeds a predefined current limit. In one embodiment, the supply voltage generation circuit regulates an amount of bidirectional energy from the secondary winding of the transformer.

To activate the SR switch 124, the drive voltage generated by the driver circuit 132 is significantly higher than the threshold voltage of the SR switch in order to reach the minimum on resistance of the SR switch. Compared to conventional synchronous rectifier devices that require an additional transformer winding or an output voltage adapter to boost driver supply voltages, the SR controller 126 depicted in FIG. 1 does not require additional transformer windings or output voltage adapters. Consequently, compared to conventional synchronous rectifier devices, the SR controller can reduce component costs of the power converter circuit 100 and allow the power converter circuit to be used in various applications, including applications that do not allow additional outputs on transformers.

Figure 2:
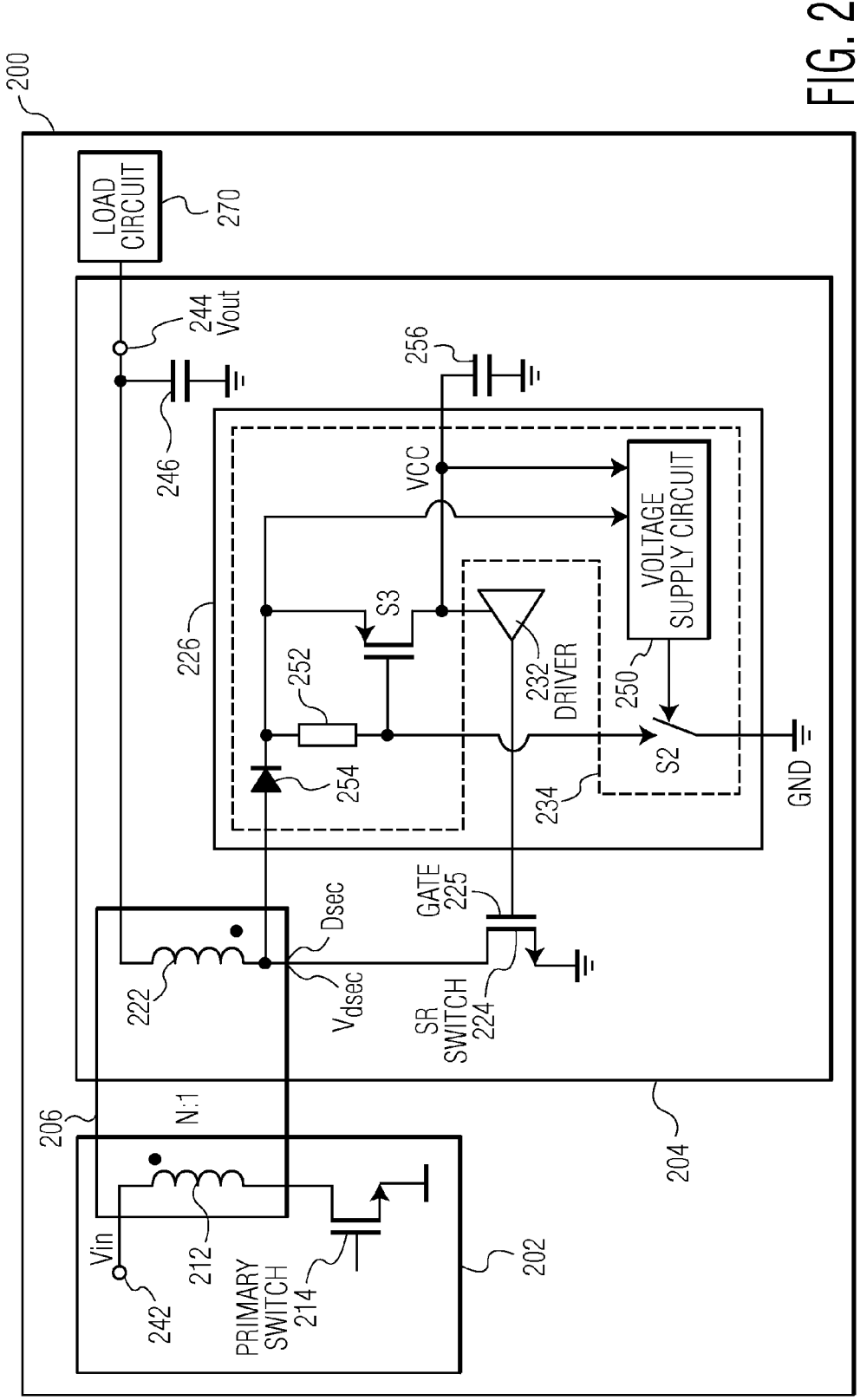
FIG. 2 depicts an embodiment of the power converter circuit depicted in FIG. 1.

FIG. 2 depicts an embodiment of the power converter circuit 100 depicted in FIG. 1. In the embodiment depicted in FIG. 2, a power converter circuit 200 includes a primary power circuit 202 and a secondary power circuit 204. The primary power circuit 202 includes a primary winding 212 and a MOSFET transistor switch 214. In some embodiments, the primary power circuit 202 includes a primary controller that is similar to or the same as the primary controller 116. The primary winding 212 is connected to an input terminal 242 of the power converter circuit 200, from which an input voltage, "Vin," is received.

The secondary power circuit 204 includes a secondary winding 222, a synchronous rectifier (SR) switch 224 and an SR controller 234. The primary winding 212 and the secondary winding 222 forms a transformer 206 with a voltage ratio or a winding turns ratio, "N," which is a positive rational number. The secondary winding 222 is connected to an output terminal 244 of the power converter circuit 200, from which an output voltage, "Vout," is output to a load circuit 270, and a capacitor 246 that is connected to the ground. The load circuit 270 is also connected to the ground. The output voltage, "Vout," is generated using the secondary winding 222. Although the power converter circuit 200 is shown in FIG. 2 as including certain components, in some embodiments, the power converter circuit 200 includes less or more components to implement less or more functionalities. For example, although a flyback converter is used in the power converter circuit 200, the power converter circuit 200 can also use other type of converters where a transformer winding is connected to an output voltage using a SR switch, such as resonant converters. Although the load circuit 270 is shown in FIG. 2 as being external to the secondary power circuit 204, in some embodiments, the load circuit 270 may be part of the secondary power circuit 204. In addition, although the load circuit 270 is shown in FIG. 2 as being a part of the power converter circuit 200, in some embodiments, the load circuit 270 may be external to (not a part of) the power converter circuit 200.

The SR controller 226 is configured to control the SR switch 224. In the embodiment depicted in FIG. 2, the SR controller 226 includes a SR driver circuit 232 and a supply voltage generation circuit 234, which includes a voltage supply circuit/voltage regulator circuit 250 that has a voltage, "$V_{CC}$," switches, "S2," "S3," a gate discharge resistor 252 and a diode 254. The voltage supply circuit 250 is connected to a capacitor 256, which is connected to the ground. The capacitor 256 may be part of the supply voltage generation circuit 234. In the embodiment depicted in FIG. 2, energy from magnetizing inductance of the transformer 206 can be stored at the capacitor 256. The SR driver circuit 232 is configured to drive the gate terminal 225 of the SR switch 224 with a drive voltage. The SR driver circuit 232 is generally known in the field of switched-mode power supply (SMPS) Integrated circuits (ICs) as being a standard digital inverter structure. In an embodiment, the SR driver circuit 232 is a digital inverter with one or more NMOS transistors and PMOS transistors that are configured to deliver a specified source current in order to turn the gate terminal 225 of the SR switch 224 on sufficiently fast or a specified sink current in order to turn the gate terminal 225 of the SR switch 224 off sufficiently fast. The voltage supply circuit/voltage regulator circuit 250 operates to detect the time interval in which energy can be transferred from the secondary winding 222 to the capacitor 256 and generate timing signals to switch on and off the switch, "S2." For example, when the voltage Vdsec at node, "Dsec," is slightly higher than the voltage, "$V_{CC}$," the voltage supply circuit 250 closes the switch, "S2," which causes the switch, "S3," to be closed, resulting in the magnetizing current of the transformer 206 flowing into the capacitor 256. The voltage supply circuit 250 opens the switch, "S2," for example, after a fixed delay, or when the current in the diode 254 reaches 0 or the voltage, "$V_{CC}$," is sufficiently large. The SR switch 224 and the switch, "S2," are connected to the ground. The diode 254 is connected to the secondary winding 222, the gate discharge resistor 252, the voltage supply circuit 250 and the switches, "S2," "S3." The diode 254 can prevent a conduction path between the voltage, "Vdsec," at node, "Dsec," and the voltage, "$V_{CC}$," when the voltage, "Vdsec," at node, "Dsec," is lower than the voltage, "$V_{CC}$," of the voltage supply circuit 250. The diode 254 is used because the body-diode of the switch, "S3," can conduct current, making it impossible to switch off the conductive path of the switch, "S3." The switch, "S3," is used to connect the secondary winding 222 to the voltage supply circuit 250. In the embodiment depicted in FIG. 2, the switch, "S3," is driven by the switch, "S2," and the gate discharge resistor 252. Compared to the switch, "S2," the gate terminal of the switch, "S3," operates at a relatively high voltage with respect to the ground or the fixed voltage. The secondary winding 222 delivers a converted voltage for the SR controller 226 and the output terminal 244, from which the output voltage, "Vout," is output.

The supply voltage generation circuit 234 can supply the SR driver circuit 232 partly from the secondary winding 222 of the transformer 206. In some embodiments, the supply voltage generation circuit 234 generates a supply voltage for the SR driver circuit 232 that is higher than the output voltage, "Vout," of the power converter circuit 200. In these embodiments, the switch, "S3," is closed during an interval in which an optimum or almost optimum energy transfer from the secondary winding 222 to the supply voltage generation circuit 234 takes place. In one embodiment, an optimum energy transfer is defined as an energy transfer with an optimum efficiency. The energy received in the capacitor 256 is equal to the transferred charge, "Q," times the voltage, "VCC," of the voltage supply circuit 250 while the energy transferred from the transformer 206 is equal to the transferred charge, "Q," times the voltage, "Vdsec," at node, "Dsec." The energy efficiency of the secondary power circuit 204 is equal to the ratio "Vdsec/VCC," between the voltage, "VCC," of the voltage supply circuit 250 and the voltage, "Vdsec," at node, "Dsec." Because the voltage, "Vdsec," at node, "Dsec," is higher than the voltage, "VCC," of the voltage supply circuit 250, the energy efficiency of the secondary power circuit 204 is always smaller than 1. However, as long as the voltage drop across the switch, "S3," and the diode 254 is small, (e.g., in an interval in which a moderate current flows in the secondary winding 222), an almost optimum energy transfer from the secondary winding 222 to the supply voltage generation circuit 234 will take place. In an embodiment, such interval is the interval after a secondary stroke of the power converter circuit 200, but before the primary switch 214 is closed and when the voltage at node, "Dsec," rises to a voltage value of "Vout+Vin/N," where N is the voltage ratio or winding turns ratio of the transformer 206. Generally, a primary stroke of the power converter circuit 200 is the interval in which energy is transferred from the input terminal 242 to the transformer 206. During a secondary stroke of the power converter circuit 200, energy is transferred from the transformer 206 to the load circuit 270 through the output terminal 244. The switch, "S3," is closed after the voltage at node, "Dsec," has reached the same value as the voltage, "$V_{CC}$," of the capacitor 256 and the voltage supply circuit 250. After the switch, "S3," is closed, the voltage at node, "Dsec," is kept approximately equal to the voltage, "$V_{CC}$," and energy can be delivered from the magnetic inductance of the transformer 206 to the capacitor 256, preventing further rise of the voltage at node, "Dsec."

However, in certain intervals, no efficient energy conversion can take place, or the stresses in the switch, "S3," or the voltage supply circuit 250 become unacceptable, such as during the primary stroke of the power converter circuit 200. In these intervals, the primary power circuit 202 applies a voltage of "Vout+Vin/N" at node, "Dsec," which can cause a sudden increase of the current in the switch, "S3," while the switch, "S3," is still closed. During such intervals, the voltage supply circuit 250 detects that a current limit circuit actively limits the current in the switch, "S3," indicating a non-optimum energy transfer from the secondary winding to the supply voltage generation circuit takes place. In one embodiment, the voltage supply circuit 250 senses the voltage across the switch, "S3." Upon detecting the non-optimum energy transfer condition, the switch, "S3," is opened by opening the switch, "S2."

Figure 3:
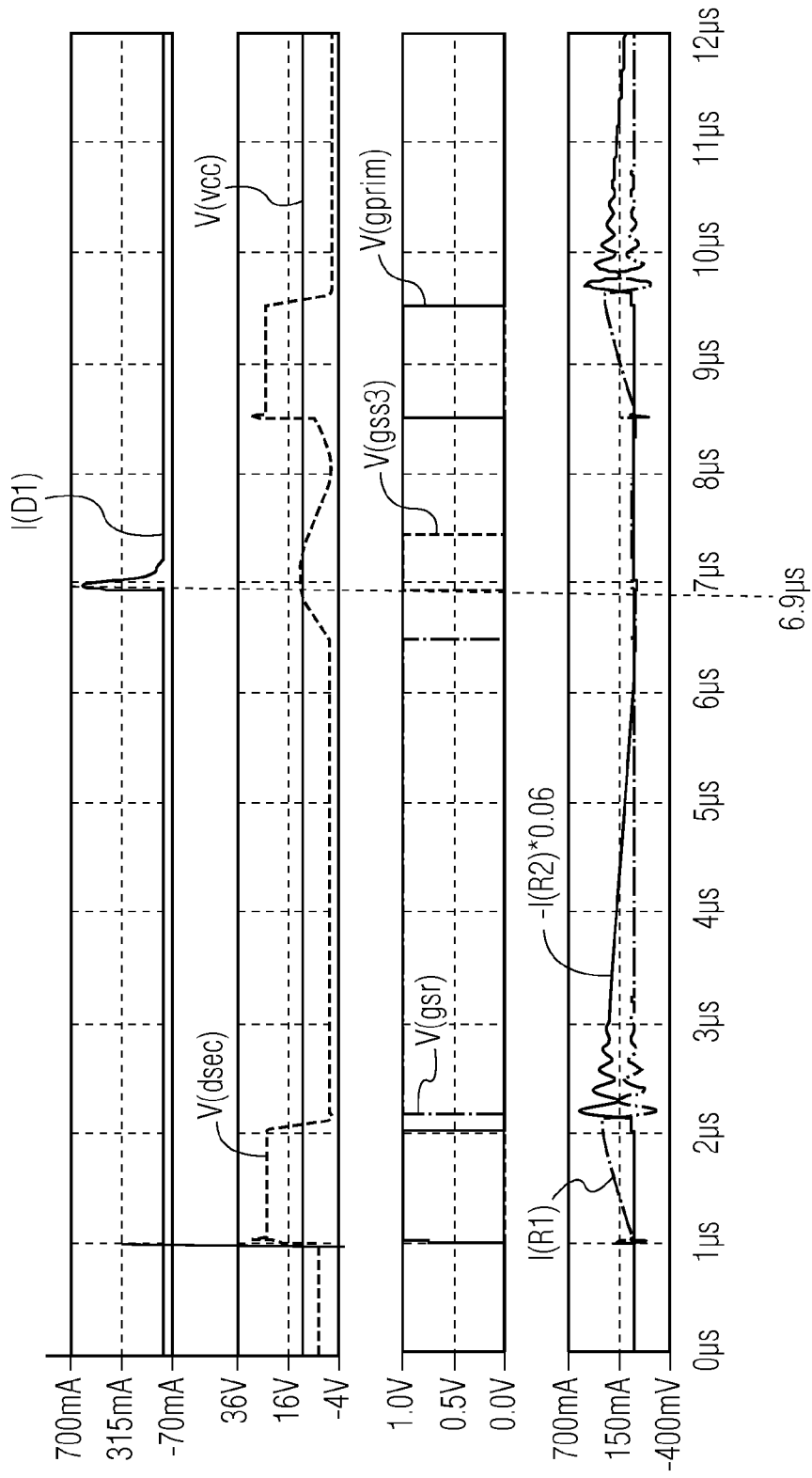
FIGS. 3-5 show some examples of currents and voltages in the power converter circuit depicted in FIG. 2.

Normally the SR switch 224 is turned off at the end of the secondary stroke of the power converter circuit 200 when the current flowing through the secondary winding 222 reaches zero. Subsequently, energy stored in the parasitic capacitances in parallel with the transformer windings 212, 222 starts to resonate with the magnetic inductance of the transformer 206, which results in a ringing at node, "Dsec," with an amplitude equal to the output voltage, "Vout," of the power converter circuit 200. The result is that with VCC=2× Vout (e.g., Vout=5V, VCC=10V), causing effectively no energy be delivered to the capacitor 256. In the embodiment depicted in FIG. 2, energy can be delivered under high efficiency conditions to the capacitor 256. Specifically, the SR switch 224 is switched on for an additional time period after the current flowing through the secondary winding 222 reaches zero, which is generally known as "bidirectional flyback action," as the current flowing through the secondary winding becomes bidirectional (i.e., flows back and forth from the output terminal 244 and the secondary winding 222). Effectively during this bidirectional interval, the direction of energy transfer reverses, making energy to be transferred from the load circuit 270 to the transformer 206. The bidirectional energy can be effectively re-used to be delivered to the capacitor 256 with a high efficiency. In summary, the energy needed to charge the capacitor 256 can be regulated by adapting the negative current in the SR switch 224 (e.g., by adapting the additional time of the SR switch conduction interval after the secondary current reached zero) after the end of the secondary stroke. FIG. 3 shows some examples of currents and voltages in the power converter 200 circuit depicted in FIG. 2 by adapting the additional time of the SR switch conduction interval. In the embodiment depicted in FIG. 3, at the end of the secondary stroke, bidirectional energy is build up by keeping the SR switch 224 with gate voltage, "V(gsr)," on after the secondary current (I(R2)) reverses. The primary gate voltage (i.e., the gate voltage of the primary switch 214), "V(gprim),"

switches between a high voltage (e.g., 1V) and a low voltage (e.g., 0V). Although some examples of voltages (e.g., a high voltage of 1V) are provided herein, in other embodiments, different voltages (e.g., a high voltage of around 10V) may be used. When the SR switch 224 is opened, the drain voltage, "V(dsec)," of the SR switch 224 rises and as soon as the drain voltage, "V(dsec)," of the SR switch 224 reaches the voltage, "$V_{CC}$," of the capacitor 256 and the voltage supply circuit 250 (as shown at t=6.9 usec, Vdsec=Vcc), the switch, "S3," (with a voltage, "V(vgss3),") is turned on. Consequently, a current, "I(d1)," flows from the secondary winding 222 towards the capacitor 256, while the bidirectional energy is delivered to the capacitor 256. When the current, "I(D1)," becomes close to zero, the switch, "S3," is opened. Alternatively, the switch, "S3," is opened after a fixed time, based on a guaranteed amount of energy delivered.

Figure 4:
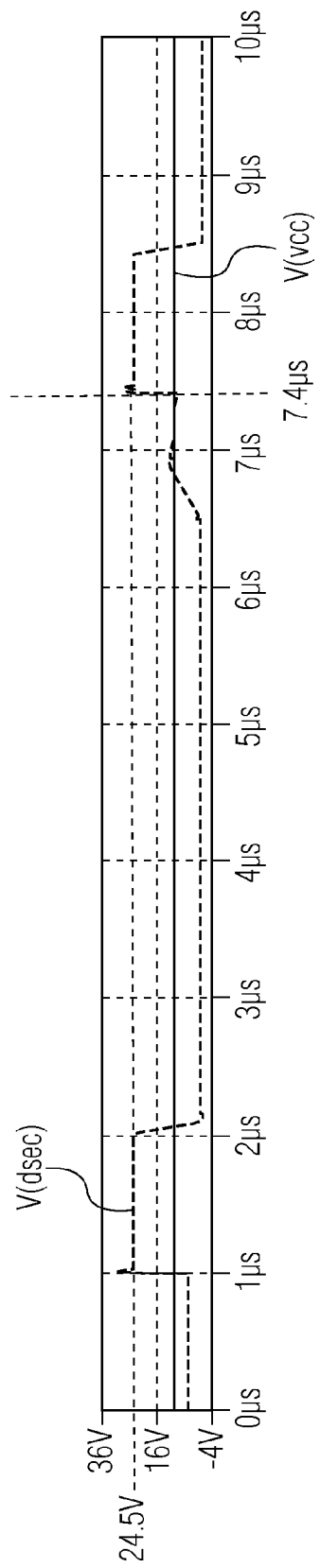

Turning back to the power converter circuit 200 depicted in FIG. 2, in some embodiments, a current limit is used in order to prevent the charge current for the voltage supply circuit 250 to rise above a maximum level, in a situation in which the primary switch 214 and the switch, "S3" are closed. FIG. 4 shows some examples of voltages in the power converter circuit 200 depicted in FIG. 2 by imposing a current limit for the voltage supply circuit 250. Around 7.4 micro second (μs), the primary switch 214 is closed, which causes the voltage, "Vdsec," at the node, "Dsec," to reach the voltage, "$V_{CC}$," of the capacitor 256 and the voltage supply circuit 250 and rise to around 24.5V (i.e., Vout+Vin/N, where N is the voltage ratio or winding turns ratio of the transformer 206). The current in the switch, "S3," is then limited to 1 A, while the current limit triggers the switch, "S3," to be opened in order to prevent long duration of this undesired situation.

Figure 5:
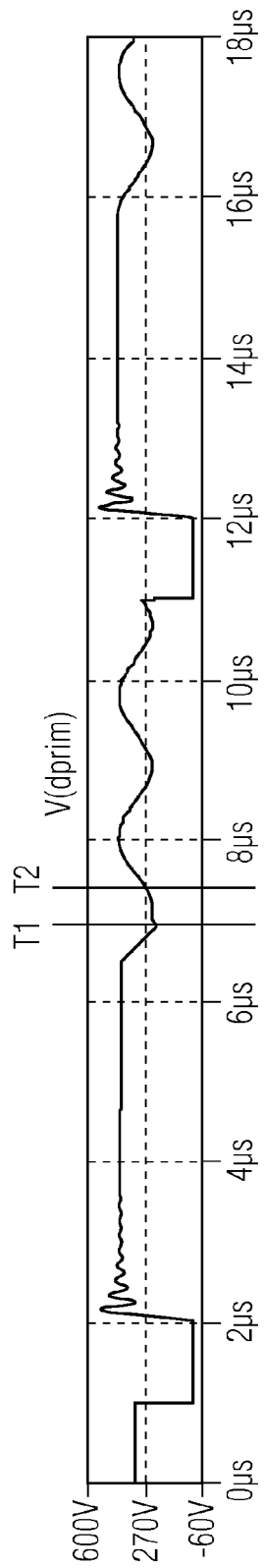

Turning back to the power converter circuit 200 depicted in FIG. 2, in some embodiments, the energy delivery to the voltage supply circuit can affect the drain voltage of the primary switch 214. FIG. 5 shows an example of the primary drain voltage (i.e., the drain voltage of the primary switch 214) in the power converter circuit 200 depicted in FIG. 2. In the embodiment depicted in FIG. 5, after the end of the secondary stroke up to the moment (T1) that the switch, "S3," is closed, the primary drain voltage (i.e., the drain voltage of the primary switch 214), "V(dprim)," rings/fluctuates as usual. However, when the switch, "S3," is closed at the moment (T2), the ringing of the primary drain voltage stops and stays at a fixed level. Conventional power converter circuits, which use valley switching to reduce the switching losses of the primary switch 214, may detect the change in the primary drain voltage as a valley and closes the primary switch 214. However, the closure of the primary switch 214 can lead to a large voltage across the switch, "S3," and an inefficient energy transfer to the capacitor 256. The power converter circuit 200 depicted in FIG. 2 can prevent the closure of the primary switch 214 until the switch, "S3," is opened in order to optimize the efficient energy transfer. In an embodiment, a protocol is defined in which the energy conversion to the capacitor 256 takes place during the first ringing after the end of the secondary stroke of the power converter circuit 200. A fixed on-time may be defined for the switch, "S3," based on a transfer of most of the stored magnetic energy. The exact moment for closure of the primary switch 214 can then be based on the detected valley (T1) and the defined on-time of the switch, "S3."

In another embodiment, the voltage, "$V_{CC}$," of the capacitor 256 and the voltage supply circuit 250 is regulated to the desired value by closing the switch, "S3," and allowing the voltage, "$V_{CC}$," rise to a desired upper threshold during N (N is a positive integer) periods, followed by M (M is a positive integer) periods where no bidirectional flyback stroke is generated and the switch, "S3," is opened, in order to let the voltage, "$V_{CC}$," drop to a lower threshold.

In another embodiment, the voltage, "$V_{CC}$," of the capacitor 256 and the voltage supply circuit 250 is regulated to the desired value by regulating the bi-directional fly-back (bidifly) energy in accordance to the deviation of the voltage, "$V_{CC}$," from the desired voltage level. The bidifly energy can be adapted by adapting the additional on-time of the SR switch 224 after the current that flows between the secondary winding 222 towards the capacitor 256 reverses. The additional on-time may be set directly based on the negative current level in the SR switch 224 at the moment that the SR switch 224 is opened.

Figure 6:
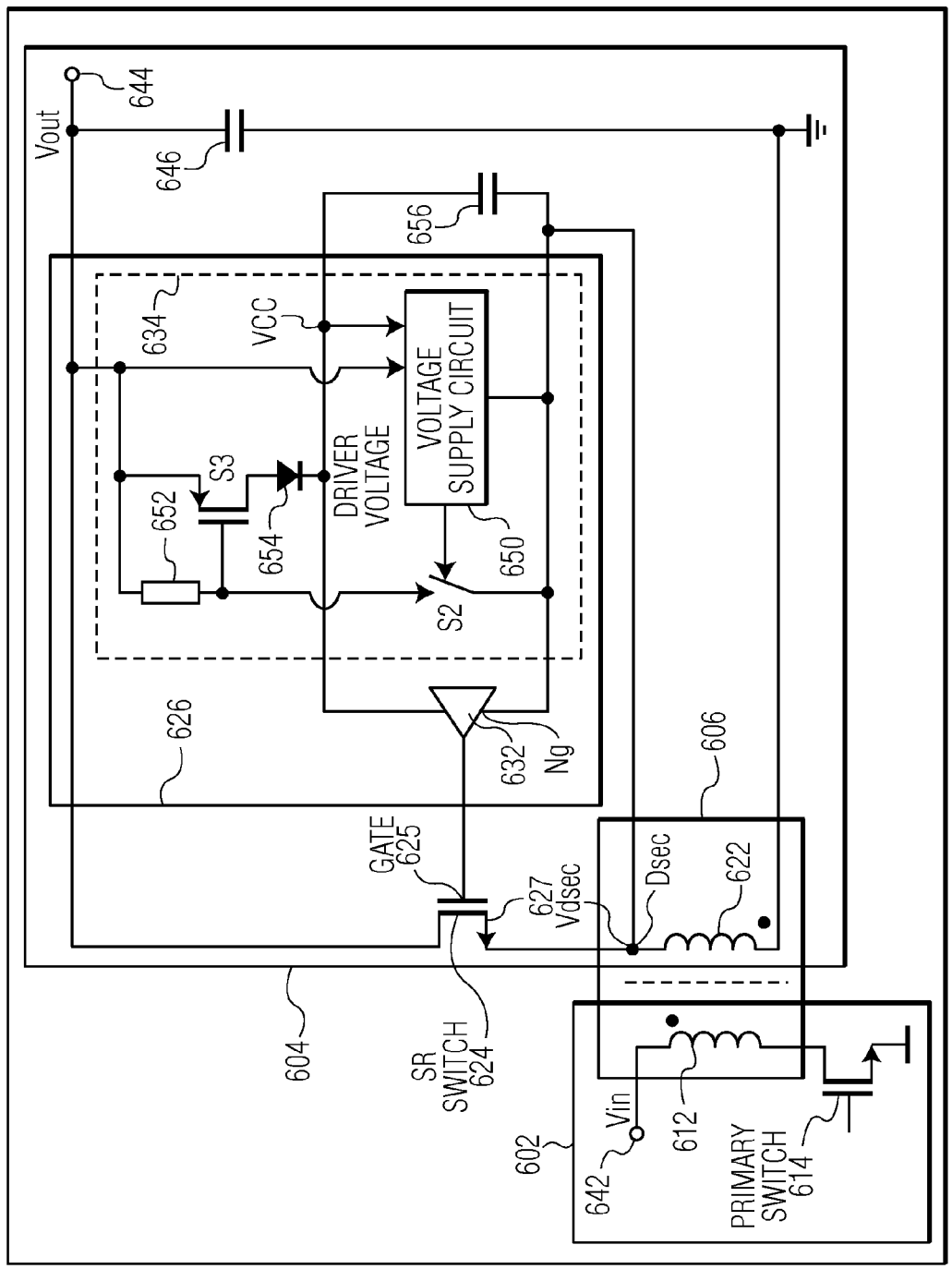
FIG. 6 depicts another embodiment of the power converter circuit depicted in FIG. 1.

In the embodiment depicted in FIG. 2, the SR switch 224 is connected to the ground or other fixed voltage. However, in some embodiments, the SR switch 224 is connected in series with an output terminal from which an output voltage of the power converter circuit 200 is output. FIG. 6 depicts an embodiment of the power converter circuit 100 depicted in FIG. 1 in which a SR switch 624 is connected in series with an output terminal 644 of a power converter circuit 600. In the embodiment depicted in FIG. 6, the power converter circuit 600 includes a primary power circuit 602 and a secondary power circuit 604. The primary power circuit 602 includes a primary winding 612 and a MOSFET transistor switch 614. In some embodiments, the primary power circuit 602 includes a primary controller that is similar to or the same as the primary controller 116. The primary winding 612 is connected to an input terminal 642 of the power converter circuit 600, from which an input voltage, "Vin," is received. The secondary power circuit 604 includes a secondary winding 622, a synchronous rectifier (SR) switch 624 and an SR controller 626. The secondary winding 622 is connected to an output terminal 644 of the power converter circuit 600, from which an output voltage, "Vout," is output to a load circuit (not shown), and a capacitor 646 that is connected to the ground or other fixed voltage. The output voltage, "Vout," is generated using the secondary winding 622. The primary winding 612 and the secondary winding 622 forms a transformer 606 with a voltage ratio or a winding turns ratio, "N," which is a positive rational number. In the embodiment depicted in FIG. 6, the SR controller 626 includes a SR driver circuit 632 and a supply voltage generation circuit 634, which includes a voltage supply/regulator circuit 650 that has a voltage, "$V_{CC}$," switches, "S2," "S3," a gate discharge resistor 652 and a diode 654. The SR driver circuit 632 is configured to drive the gate terminal 625 of the SR switch 624 with a drive voltage. The voltage supply circuit 650 is connected to a capacitor 656, which is connected to the secondary winding 622 of the transformer 606. The capacitor 656 may be part of the supply voltage generation circuit 634. In the embodiment depicted in FIG. 6, energy from magnetizing inductance of the transformer 606 can be stored at the capacitor 656. In some applications, compared to using a grounded SR switch, using the SR switch 624 serially connected with the output terminal 644, from which an output voltage, "Vout," is output, can reduce common mode Electromagnetic interference (EMI).

The power converter circuit 600 depicted in FIG. 6 operates similarly to or the same as the power converter circuit 200 depicted in FIG. 2. However, in the embodiment depicted in FIG. 6, the ground node (or fixed voltage node), "Ng," of the SR driver circuit 232 is connected to both the source terminal 627 of the SR switch and node, "Dsec," of the secondary winding 622. The SR controller 626 causes node, "Ng," to switch between the output voltage, "Vout," of the power converter circuit 600 during the secondary stroke of the power converter circuit 600 and a voltage of "Vin/N" during the primary stroke of the power converter circuit 600, where, "Vin," is the primary side supply voltage and N is the turns ratio of the transformer 606.

In order to supply the voltage supply circuit 650 from the output voltage, "Vout," of the power converter circuit 600, the switch, "S3," is closed in a similar window as described with respect to FIG. 2. In some embodiments, the switch, "S3," is closed after the end of the secondary stroke of the power converter circuit 600, when the voltage at node, "Dsec," changes to a negative voltage. For example, the switch, "S3," is closed after the end of the secondary stroke, when the voltage, "$V_{CC}$," at the voltage supply circuit 650 becomes lower than the output voltage, "Vout," of the power converter circuit 600. In some embodiments, a current limit is used in order to prevent the charge current for the voltage supply circuit to rise above a maximum level, in a situation in which the primary switch 614 and the switch, "S3," are closed, similarly to the operation described with respect to FIG. 2.

Figure 7:
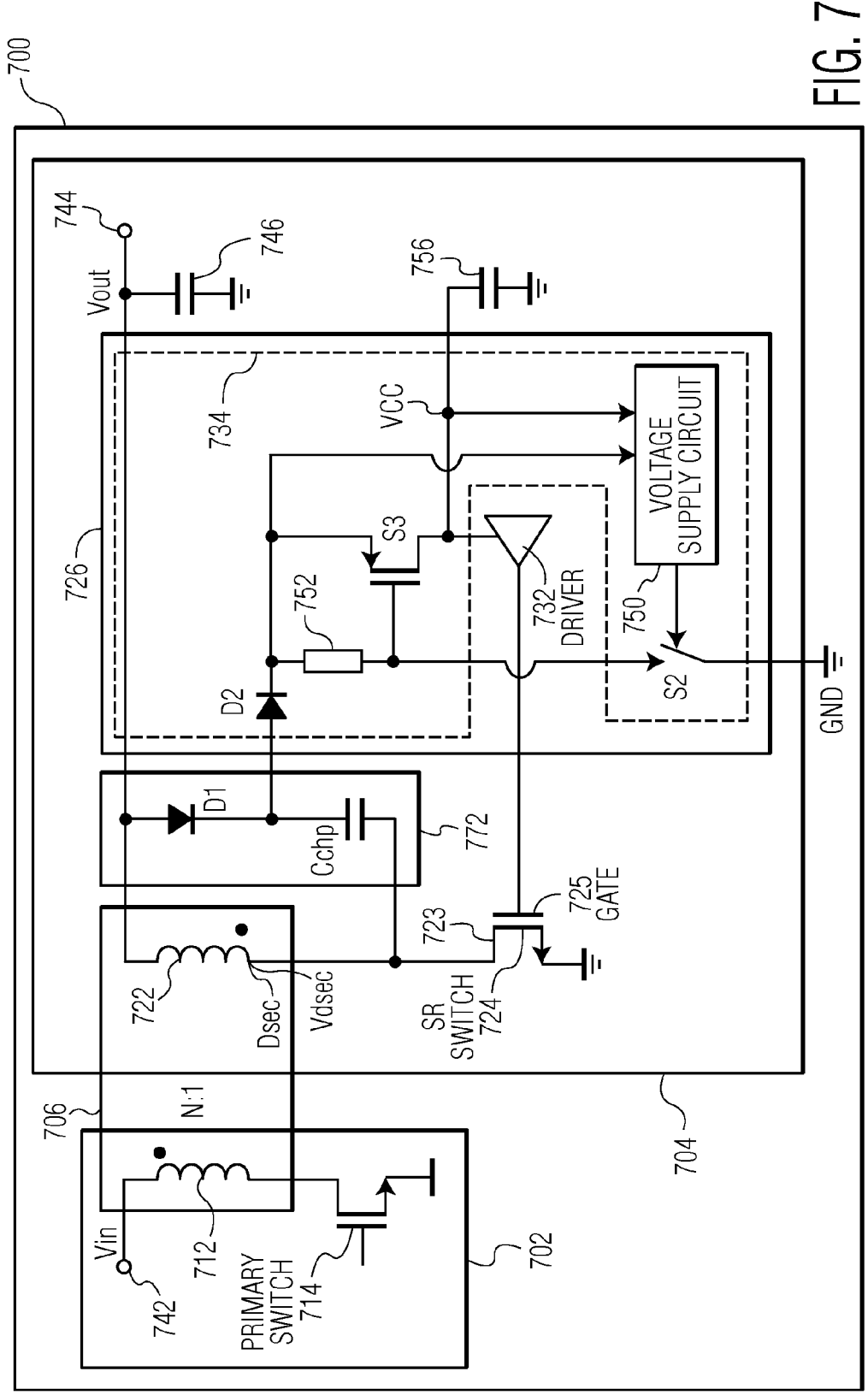
FIG. 7 depicts another embodiment of the power converter circuit depicted in FIG. 1.

In the embodiment depicted in FIGS. 2 and 6, energy transfer to the SR controller 226 or 626 is directly from the secondary winding 222 or 622 of the transformer 206 or 606, respectively. However, in some embodiments, energy transfer from the secondary winding 222 or 622 to the SR controller 226 or 626 is through a charge pump structure/device. FIG. 7 depicts an embodiment of the power converter circuit 100 depicted in FIG. 1 with a charge pump 772. In the embodiment depicted in FIG. 7, the power converter circuit 700 includes a primary power circuit 702 and a secondary power circuit 704. The primary power circuit 702 includes a primary winding 712 and a MOSFET transistor switch 714. In some embodiments, the primary power circuit 702 includes a primary controller that is similar to or the same as the primary controller 116. The primary winding 712 is connected to an input terminal 742 of the power converter circuit 700, from which an input voltage, "Vin," is received. The secondary power circuit 704 includes a secondary winding 722, a MOSFET transistor synchronous rectifier (SR) switch 724, the charge pump 772 and an SR controller 726. The secondary winding 722 is connected to an output terminal 744 of the power converter circuit 700, from which an output voltage, "Vout," is output to a load circuit (not shown), and a capacitor 746 that is connected to the ground or other fixed voltage. The output voltage, "Vout," is generated using the secondary winding 722. The primary winding 712 and the secondary winding 722 forms a transformer 706 with a voltage ratio or a winding turns ratio, "N," which is a positive rational number. The charge pump 772 includes a charge pump capacitor, "Cchp," and a charge pump diode, "D1." The SR controller 726 includes a SR driver circuit 732 and a supply voltage generation circuit 734, which includes a voltage supply circuit 750 that has a voltage, "$V_{CC}$," switches, "S2," "S3," a gate discharge resistor 752 and a diode, "D2." The SR driver circuit 732 is configured to drive the gate terminal 725 of the SR switch 724 with a drive voltage. The voltage supply circuit 750 is connected to a capacitor 756, which is connected to the ground or other fixed voltage. The capacitor 756 may be part of the supply voltage generation circuit 734. In the embodiment depicted in FIG. 7, energy from magnetizing inductance of the transformer 706 can be stored at the capacitor 756.

During the secondary stroke of the power converter circuit 700, the charge pump capacitor, "Cchp," is charged from the output voltage, "Vout," of the power converter circuit 700 by the charge pump diode, "D1." During the energy transfer interval, the charge pump capacitor, "Cchp," is discharged to the voltage, "$V_{CC}$," of the capacitor 756 and voltage supply circuit 750 by the diode, "D2." The switch, "S3," defines during which cycle(s) energy transfer is enabled. Consequently, the voltage, "$V_{CC}$," can be regulated to the desired value by enabling the switch, "S3," during N (N is a positive integer) cycles and disabling the switch, "S3," during M (M is a positive integer) cycles in relation to the momentary value of the voltage, "$V_{CC}$." Compared to the power converter circuits 200, 600 in which energy transfer to the SR controller 226 or 626 is directly from the secondary winding 222 or 622, the power converter circuit 700 depicted in FIG. 7 is particularly suited for single mains applications. A single mains application only uses one mains input voltage, for example, European mains (230 VAC 50 Hz) or US mains (110 VAC 60 Hz). However, in other embodiments, the power converter circuit 700 can be connected to any mains voltage worldwide. Specifically, the voltage, "$V_{CC}$," is charged by pumping charge as defined by the charge pump capacitor, "Cchp," and the voltage Vdesc at the drain terminal 723 of the SR switch 724 rises across the secondary winding 722 after a secondary stroke. For example, the voltage Vdesc of the secondary winding 722 can be at 0V at the end of the secondary stroke and rises to a voltage of Vout+Vin/N (N is the voltage ratio or winding turns ratio of the transformer 706) at the beginning of the primary stroke. Generally, the voltage, "$V_{CC}$," is set to be larger than the output voltage, "Vout," of the power converter circuit 700. For example, charge may be only transferred to the voltage, "$V_{CC}$," when the voltage Vdesc of the secondary winding 722 is at a voltage that is larger than 2×Vout. Because this voltage rise of the secondary winding 722 directly defines the amount of charge, and the efficiency at which the charge can be transferred, any variation at the input voltage, "Vin," of the power converter circuit 700 directly results in a variation of the amount of charge and efficiency. Consequently, the power converter circuit 700 depicted in FIG. 7 is particularly suited for (but not limited to) single mains applications.

Figure 8:
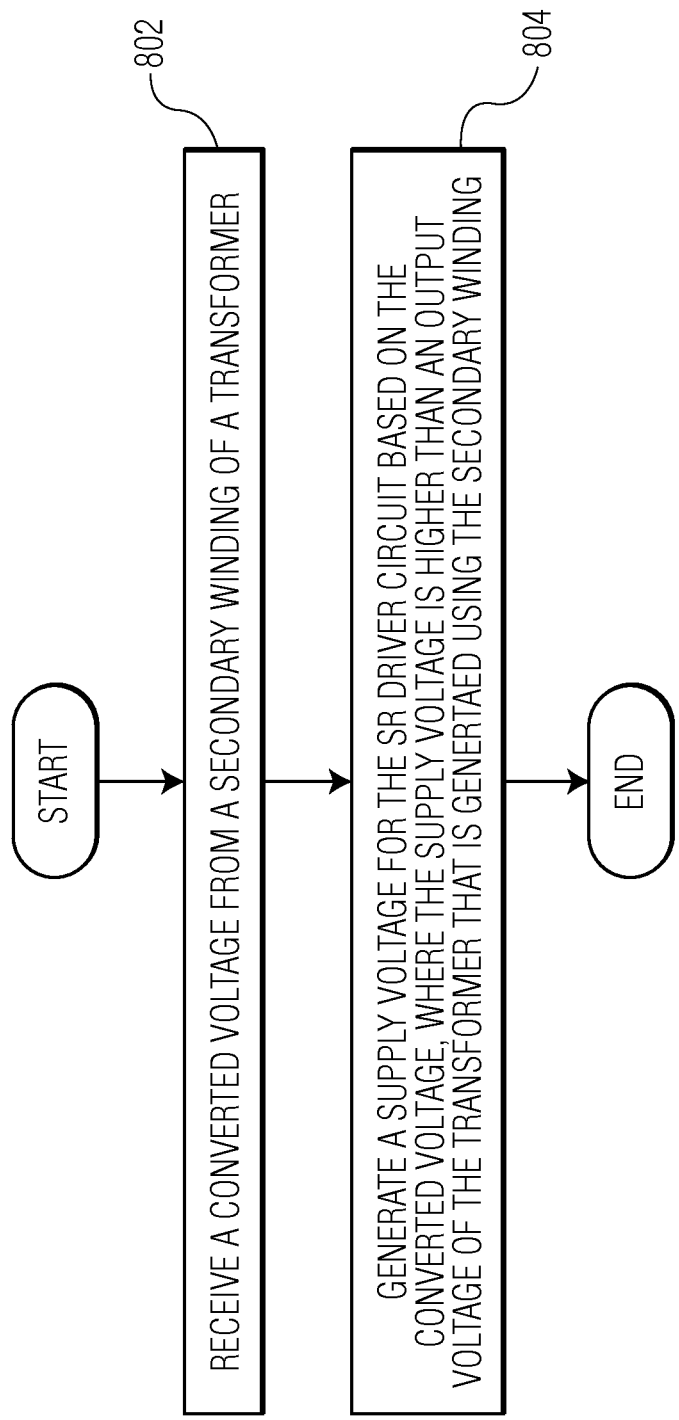
FIG. 8 is a process flow diagram of a method for supplying a synchronous rectifier (SR) driver circuit in accordance with an embodiment of the invention.

FIG. 8 is a process flow diagram of a method for supplying a synchronous rectifier (SR) driver circuit in accordance with an embodiment of the invention. The SR driver circuit may be similar to or same as the driver circuits 132, 232, 632, 732 depicted in FIGS. 1, 2, 6, and 7. At block 802, a converted voltage is received from a secondary winding of a transformer. At block 804, a supply voltage for the SR driver circuit is generated based on the converted voltage, where the supply voltage is higher than an output voltage of the transformer that is generated using the secondary winding.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for supplying a synchronous rectifier (SR) driver circuit using a supply voltage generation circuit, the method comprising:
   receiving a converted voltage from a secondary winding of a transformer; and
   generating a supply voltage for the SR driver circuit to drive an SR switch that is connected to the secondary winding based on the converted voltage,
   wherein the supply voltage is higher than an output voltage of the transformer that is generated using the secondary winding,
   wherein generating the supply voltage comprises closing a first switch, which is external to the SR driver circuit and is connected to the SR driver circuit, during an interval in which an energy transfer from the secondary winding to the SR driver circuit takes place, and
   wherein generating the supply voltage for the SR driver circuit comprises generating the supply voltage for the SR driver circuit to drive the SR switch that is connected to the secondary winding based on the converted voltage without an additional secondary winding of the transformer;
   wherein the supply voltage generation circuit includes,
      the first switch connected to the secondary winding of the transformer and the SR driver circuit;
      a second switch having a terminal that is directly connected to the secondary winding of the transformer or a ground; and
      a voltage supply circuit connected to the first and second switches and the SR driver circuit and configured to generate the supply voltage.

2. The method of claim 1, wherein generating the supply voltage comprises:
   monitoring a current that flows through the first switch while a primary switch that is connected to a primary winding of the transformer is closed; and
   opening the first switch when the current exceeds a predefined current limit.

3. The method of claim 1, wherein generating the supply voltage comprises opening the first switch while a primary switch that is connected to a primary winding of the transformer is closed.

4. The method of claim 1, wherein generating the supply voltage comprises:
   closing the first switch for a first time period; and
   subsequently, opening the first switch for a second time period.

5. The method of claim 1, wherein generating the supply voltage comprises:
   closing the first switch for a first time period such that the supply voltage increases above a first voltage threshold; and
   subsequently, opening the first switch for a second time period such that the supply voltage decreases below a second voltage threshold,
   wherein the first voltage threshold is higher than the second voltage threshold.

6. The method of claim 1,
   wherein generating the supply voltage comprises regulating an amount of bidirectional energy from the secondary winding of the transformer to the supply of the SR driver circuit.

7. The method of claim 1,
   wherein generating the supply voltage comprises generating the supply voltage using a charge pump.

8. A supply voltage generation circuit for a synchronous rectifier (SR) driver circuit, the supply voltage generation circuit comprising:
   a first switch connected to a secondary winding of a transformer and the SR driver circuit;
   a second switch having a terminal that is directly connected to the secondary winding of the transformer or a ground; and
   a voltage supply circuit connected to the first and second switches and the SR driver circuit and configured to generate a supply voltage for the SR driver circuit to drive an SR switch that is connected to the secondary winding based on a converted voltage from the secondary winding of the transformer without an additional secondary winding of the transformer,
   wherein the supply voltage is higher than an output voltage of the transformer that is generated using the secondary winding, and
   wherein the voltage supply circuit is configured to close the first switch, which is external to the SR driver circuit and is connected to the SR driver circuit, during an interval in which an energy transfer from the secondary winding to the SR driver circuit takes place.

9. The supply voltage generation circuit of claim 8, wherein the voltage supply circuit is configured to:
   monitor a current that flows through the first switch while a primary switch that is connected to a primary winding of the transformer is closed; and
   cause the first switch to open when the current exceeds a predefined current limit.

10. The supply voltage generation circuit of claim 8,
    wherein the first switch is configured to be open while a primary switch that is connected to a primary winding of the transformer is closed.

11. The supply voltage generation circuit of claim 8,
    wherein the first switch is configured to be closed for a first time period and subsequently, open for a second time period.

12. The supply voltage generation circuit of claim 8,
    further comprising a diode connected between the first switch and the secondary winding of the transformer.

13. The supply voltage generation circuit of claim 8,
    wherein the voltage supply circuit is configured to control the second switch.

14. A synchronous rectifier device comprising the supply voltage generation circuit and the SR driver circuit of claim 8 and a synchronous rectifier (SR) switch configured to be driven by the SR driver circuit.

15. The supply voltage generation circuit of claim 8,
    further comprising a capacitor connected to the voltage supply circuit and the ground or connected to the voltage supply circuit and the secondary winding.

16. The supply voltage generation circuit of claim 8,
    further comprising a charge pump.

17. The supply voltage generation circuit of claim 16,
    wherein the charge pump comprises a diode and a capacitor that are connected to the secondary winding of the transformer.

* * * * *